US011410331B2

(12) United States Patent
Kassis et al.

(10) Patent No.: US 11,410,331 B2
(45) Date of Patent: Aug. 9, 2022

(54) SYSTEMS AND METHODS FOR VIDEO COMMUNICATION USING A VIRTUAL CAMERA

(71) Applicant: Facebook Technologies, LLC, Menlo Park, CA (US)

(72) Inventors: Ronit Kassis, Sunnyvale, CA (US); Brian Keith Cabral, San Jose, CA (US); Michael F. Cohen, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 214 days.

(21) Appl. No.: 16/702,111

(22) Filed: Dec. 3, 2019

(65) Prior Publication Data

US 2021/0104063 A1 Apr. 8, 2021

Related U.S. Application Data

(60) Provisional application No. 62/910,021, filed on Oct. 3, 2019.

(51) Int. Cl.
*G06T 7/73* (2017.01)
*G06F 3/01* (2006.01)
*G06F 3/04815* (2022.01)
*G06T 19/00* (2011.01)
*G06V 40/19* (2022.01)

(52) U.S. Cl.
CPC ........... *G06T 7/74* (2017.01); *G06F 3/013* (2013.01); *G06F 3/04815* (2013.01); *G06T 19/006* (2013.01); *G06V 40/19* (2022.01); *G06T 2207/30244* (2013.01); *G06T 2215/16* (2013.01)

(58) Field of Classification Search
None
See application file for complete search history.

(56) References Cited

U.S. PATENT DOCUMENTS

| 10,762,688 | B2 * | 9/2020 | Ogata | G06T 19/20 |
| 2003/0210326 | A1 * | 11/2003 | Runcie | H04N 7/15 348/14.16 |
| 2010/0321482 | A1 | 12/2010 | Cleveland | |

(Continued)

FOREIGN PATENT DOCUMENTS

| WO | WO-2014/055058 A1 | 4/2014 |
| WO | WO-2017/030985 A1 | 2/2017 |

OTHER PUBLICATIONS

International Search Report and Written Opinion on related case for PCT/US2020/051340 dated Nov. 27, 2020.

(Continued)

*Primary Examiner* — Ryan M Gray
(74) *Attorney, Agent, or Firm* — Foley & Lardner LLP

(57) ABSTRACT

A method for using a virtual camera location to display image data to one device from another device associated with a plurality of cameras. The method includes receiving image data from a plurality of cameras associated with a second user device associated with a second user. The method further includes establishing a virtual camera location different from positions of the plurality of cameras. The method further includes providing an image using the image data on a first user display of a first user device based at least on a viewpoint of the virtual camera location.

20 Claims, 5 Drawing Sheets

(56) References Cited

U.S. PATENT DOCUMENTS

| | | | | |
|---|---|---|---|---|
| 2014/0098179 | A1* | 4/2014 | Moore | H04N 13/239 |
| | | | | 348/14.08 |
| 2014/0362170 | A1* | 12/2014 | Walker | H04N 19/176 |
| | | | | 348/14.08 |
| 2016/0323541 | A1* | 11/2016 | Nilsson | G06K 9/00248 |
| 2018/0307310 | A1* | 10/2018 | McCombe | H04N 13/243 |
| 2019/0043245 | A1* | 2/2019 | Ogata | H04N 7/141 |
| 2020/0045261 | A1* | 2/2020 | Lim | H04N 5/272 |
| 2020/0151427 | A1* | 5/2020 | Kimura | G06T 1/00 |

OTHER PUBLICATIONS

Isgro Fetal: "Three-Dimensional Image Processing in the Future of Immersive Media", IEEE Transactions on Circuits and Systems for Video Technology, Institute of Electrical and Electronics Engineers, US, vol. 14, No. 3, Mar. 1, 2004 (Mar. 1, 2004), pp. 288-303.

* cited by examiner

SYSTEMS AND METHODS FOR VIDEO COMMUNICATION USING A VIRTUAL CAMERA

FIELD OF THE DISCLOSURE

The present disclosure relates generally to display systems. More particularly, the present disclosure relates to systems and methods for providing virtually-rendered images from the perspective of a virtual camera.

BACKGROUND

The present disclosure relates generally to video communication systems. Video communication systems can be used to transmit and receive various image and audio data between users via a network. For example, a first user may use a first video communication device to converse in real-time with a second user using a second video communication device. One consideration when providing a video communication system may be to provide a realistic communication experience between the first and second users.

SUMMARY

One implementation of the present disclosure is related to a method for using a virtual camera location to display image data to one device from another device associated with a plurality of cameras, according to some embodiments. The method includes receiving image data from a plurality of cameras associated with a second user device associated with a second user. The method further includes establishing a virtual camera location different from positions of the plurality of cameras. The method further includes providing an image using the image data on a first user display of a first user device based at least on a viewpoint of the virtual camera location.

Another implementation of the present disclosure is related to a method for a system, according to some embodiments. The system comprises a receiving user device and a sending user device. The receiving user device is associated with a receiving user and has a receiving user display. The sending user device is associated with a sending user and is in communication with the receiving user device via a network. The sending user device has a sending user display, a plurality of sensors, and processing circuitry. The processing circuitry is configured to receive image data from the plurality of sensors. The processing circuitry is further configured to establish a position of a virtual camera different from positions of the plurality of sensors. The processing circuitry is further configured to render an image based at least on the image data and the position of the virtual camera. The processing circuitry is further configured to transmit, via the network, the image to the receiving user device to be displayed on the receiving user display.

Another implementation of the present disclosure is related to a video communication device associated with a user, according to some embodiments. The video communication device comprises a plurality of sensors, a display, processing circuitry, and communications circuitry. The display is arranged between at least two of the plurality of sensors. The processing circuitry is in communication with a network. The processing circuitry is configured to receive image data from the plurality of sensors. The processing circuitry is further configured to establish a position of a virtual camera different from positions of the plurality of sensors. The processing circuitry is further configured to render an image based on the image data and the position of the virtual camera. The communications circuitry is configured to transmit the image to a receiving user device via a network.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Overview

Figure 1:
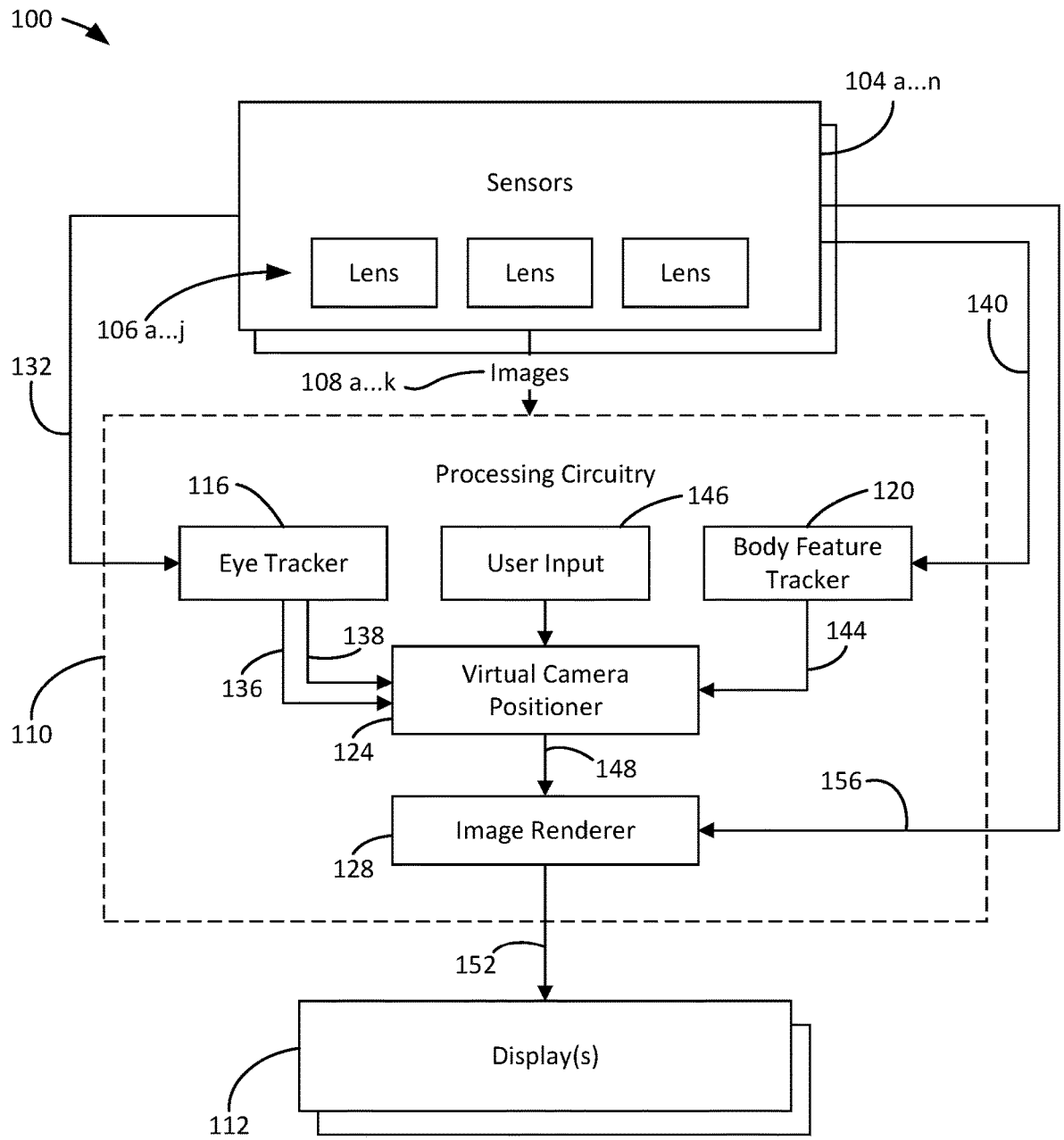
FIG. 1 a block diagram of a display system, according to some embodiments.

Referring generally to the FIGURES, systems and methods for positioning a virtual camera and providing a rendered image from the perspective of the virtual camera are shown, according to some embodiments. In some display systems (e.g., certain video communication systems or two way calling systems), a fixed camera location is typically used that is necessarily off to the side of the display surface of the user's device. Accordingly, while the user is looking at the display, the image captured by the user's device appears as though the user is looking away from the camera. In some embodiments, a mutual viewing experience of a video communication session is improved by having the display be a window into the other user's location (e.g., home or office). This result can be achieved by moving the camera to a location on the display, such that the image captured by the user's device appears as though the user is looking into the camera. However, due to physical and monetary limitations, moving the camera to a location on the display, either continuously or fixedly placing the camera at a location on or behind the screen, can be cost inhibitive and/or difficult to physically achieve.

In some embodiments, the systems and methods provided herein describe the use of a number of different computational imaging approaches with a plurality of sensors arranged around, on opposing sides of, or proximate a display to produce a virtually-rendered image appearing to be taken from a virtual camera at a position different than the position of any of the plurality of sensors. The number of sensors or cameras can be as low as two or as high as feasible for a given application. Each of the plurality of sensors capture various image data, which is applied using various image morphing, warping, and merging techniques to produce the rendered image. For example, in some embodiments, image-based and depth and geometry based approaches may be used that are model free or model based.

Accordingly, the virtual camera (and therefore the rendered image) is not tied to the position or angle of any physical camera. In some embodiments, the virtual camera is positioned to follow a gaze of the user. This gaze-following movement may be based on a user sending the video communication or the user receiving the video communication. By following the gaze of the user, the rendered image appears as though the user is looking into the camera. In some embodiments, the virtual camera is positioned based on the movement of various other body features of the user. For example, the face or head of the user may be tracked to estimate a gaze direction and gaze location. Again, by moving the virtual camera to the estimated gaze location and pointing it in the direction of the user's gaze, the rendered image appears as though the user is looking into the camera. In some embodiments, the virtual camera is positioned in the center of the display or is positioned based on a requested position provided by the user. In these instances, though the virtual camera does not follow the user, the virtual camera may be placed between the plurality of sensors, at a location on the display, which may improve the realistic nature of the video conversation.

Video Communication System

Referring now to FIG. 1, a system 100 can include a plurality of sensors 104a . . . n, processing circuitry 110, and a display 112. System 100 can be implemented using video communication system 200 described in greater detail below with reference to FIG. 2. System 100 can be implemented using the computing environment described with reference to FIG. 7. System 100 can incorporate features of and be used to implement features of video communication systems and networks. At least some of processing circuitry 110 can be implemented using a graphics processing unit (GPU). The functions of processing circuitry 110 can be executed in a distributed manner using a plurality of processing units.

Sensors 104a . . . n (generally referred to herein as sensors 104) can include any type of one or more cameras. The cameras can be visible light cameras (e.g., color or black and white), infrared cameras, night vision cameras, or combinations thereof. Sensors 104a . . . n can each include one or more lenses 106 a . . . j generally referred to herein as lens 106). In some instances, the lenses 106 may have a single focal length (e.g., a pancake lens). In some other instances, lenses 106 may comprise bifocal, multifocal, or varifocal (e.g., liquid lenses) lenses. In some embodiments, sensor 104 can include a camera for each lens 106. In some embodiments, sensor 104 can include a single camera with multiple lenses 106 a . . . j. In some embodiments, sensor 104 can include multiple cameras, each with multiple lenses 106. The one or more cameras of sensor 104 can be selected or designed to be a predetermined resolution and/or have a predetermined field of view. In some embodiments, the one or more cameras are selected and/or designed to have a resolution and field of view for detecting and/or tracking objects, such as in the field of view of a client computing system for video communication. The one or more cameras may be used for multiple purposes, such as tracking objects in a scene or an environment captured by the image capture devices described herein.

In some embodiments, sensors 104a . . . n can be image capture devices or cameras, including video cameras. Sensors 104a . . . n may be cameras that generate images of varying quality (e.g., low to high sharpness, resolution, and/or dynamic range), and may be selected to achieve a desired size, weight, and power requirement of system 100. For example, sensors 104a . . . n can generate images having resolutions on the order of hundreds of pixels by hundreds of pixels, thousands of pixels by thousands of pixels, millions of pixels by millions of pixels, etc. Accordingly, the processes executed by system 100 as described herein can be used to generate display images for presentation to a user that have desired quality characteristics, including depth characteristics.

Light of an image to be captured by sensors 104a . . . n can be received through the one or more lenses 106 a . . . j. Sensors 104a . . . n can include sensor circuitry, including but not limited to charge-coupled device (CCD) or complementary metal-oxide-semiconductor (CMOS) circuitry, which can detect the light received via the one or more lenses 106a . . . j and generate images 108a . . . k based on the received light. For example, sensors 104a . . . n can use the sensor circuitry to generate first image 108a corresponding to the first view and second image 108b corresponding to the second view. The one or more sensors 104a . . . n can provide images 108a . . . k to processing circuitry 110. The one or more sensors 104a . . . n can provide images 108a . . . k with a corresponding timestamp, which can facilitate synchronization of images 108a . . . k when image processing is executed on images 108a . . . k, such as to identify particular images (e.g., first and second images 108a, 108b) representing particular views (e.g., first and second views) and having the same timestamp that should be compared to one another to calculate gaze information.

The plurality of cameras may form one or more pairs of cameras, providing for stereographic image capturing. In some embodiments, the client computing system may have one or more additional cameras, such as a third camera between the first and second cameras, forming a triangular shape between the first, second and third cameras. This third camera may be used for triangulation techniques in performing the depth buffer generation techniques of the present solution, as well as for object tracking.

For example, system 100 can include a first sensor (e.g., image capture device) 104a that includes a first lens 106a, first sensor 104a arranged to capture a first image 108a of a first view, and a second sensor 104b that includes a second lens 106b, second sensor 104b arranged to capture a second image 108b of a second view. The first view and the second view may correspond to different perspectives, enabling depth information to be extracted from first image 108a and second image 108b. System 100 can further include a third sensor 104c that includes a third lens 106c, third sensor 104c arranged to capture a third image 108c of a third view, and a fourth sensor 104d that includes a fourth lens 106d, fourth sensor 104d arranged to capture a fourth image 108d of a fourth view. The third view and the fourth view may correspond to two additional different perspectives, allowing for additional and/or improved depth information to be extracted from third image 108c and fourth image 108d.

The one or more cameras of sensor 104 and lens 106 may be mounted, integrated, incorporated or arranged on a client computing system (e.g., a laptop, a tablet, a smartphone, a smart watch or any other wearable computing device) to capture an image or images of a user of the client computing system. For example, a client computing system may include a plurality of cameras arranged around a display (e.g., the display 112). In some embodiments, the display (e.g., the display 112) is arranged between at least two of the plurality of cameras (e.g., sensors 104).

As described with reference to FIG. 2, the first view and the second view may correspond to a left side view and a right side view, respectively. The third view and the fourth view may correspond to a top view and a bottom view, respectively. Thus, the combination of the left side and right side (or the top and bottom) views can enable system 100 to effectively handle depth information and provide sufficient image data to perform the view morphing techniques described herein. The combination of the lift side, right side, top, and bottom views may further enable system 100 to more effectively handle depth information that may be difficult to address with only first sensor 104*a* and second sensor 104*b*, such as edges (e.g., an edge of a table) that are substantially parallel to the axis between first lens 106*a* and second lens 106*b*. Further, the combination of views provided by sensors 104*a* . . . *n* allows for the creation of virtual camera views by the processing circuitry 110, as will be described further below.

Figure 2:
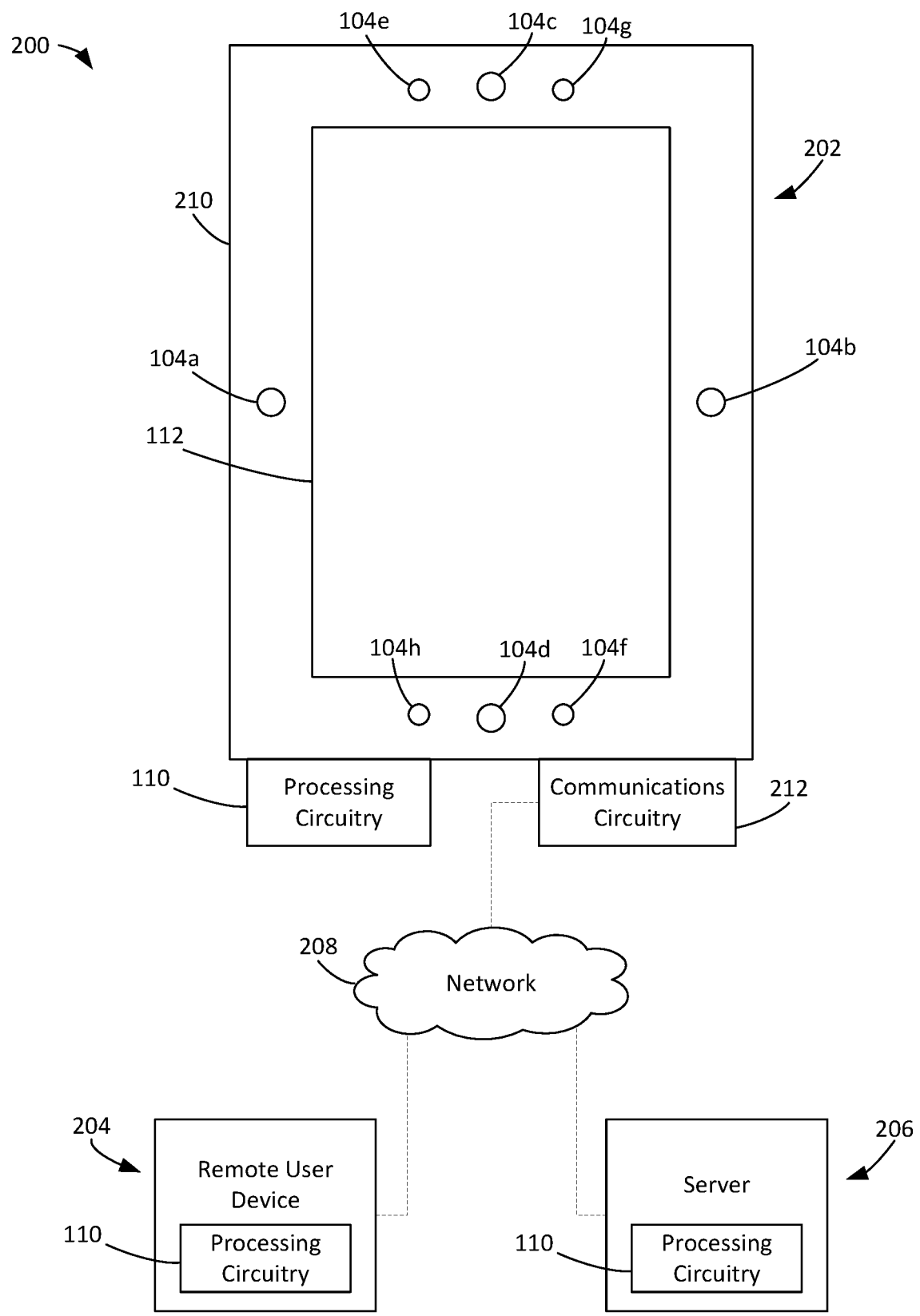
FIG. 2 is a schematic diagram of a video communication system, according to some embodiments.

It should be appreciated that eye tracking data 132 (FIG. 1), body feature tracking data 140, image data 156, and depth information may be extracted from as few as two sensors (or, in some instances, even a single sensor), and that the number and arrangement of sensors 104 provided in FIG. 2 is meant to be exemplary. A person of ordinary skill in the art will understand that a multitude of sensor arrangements can be used to achieve the processes and methods described herein without departing from the scope of the present disclosure.

Sensors 104 can provide information such as positions, orientations, or gaze directions of the eyes or head (or various other body features) of the user of the client computing system (e.g., client user device 202). For example, sensors 104 can be eye tracking sensors 104 that provide eye tracking data 132, such as data corresponding to at least one of a position or an orientation of one or both eyes of the user. In some embodiments, eye tracking data is indicative of a direction of a gaze of the user. Sensors 104 can also be head tracking sensors 104 (or other body feature tracking sensors) that provide head tracking data 150 (or other body feature tracking data), such as data corresponding to at least one of a position or an orientation of a head (or other body feature) of the user. Accordingly, sensors 104 can be oriented in a direction towards the eyes or head (or other body feature) of the user. For example, sensors 104 can include a fifth sensor 104*e* (and, in some instances, sixth through eight sensors 104*f* . . . *h*, as illustrated in FIG. 2), which can be oriented towards the eyes or head of the user to detect sensor data regarding the eyes or head of the user.

In some embodiments, sensors 104 output images of the eyes of the user, which can be processed to detect an eye position or gaze direction (e.g., first gaze direction) of the eyes. In some embodiments, sensors 104 process image data regarding the eyes of the user, and output the eye position or gaze direction based on the image data. In some embodiments, sensors 104 optically measure eye motion, such as by emitting light (e.g., infrared light) towards the eyes and detecting reflections of the emitted light.

Processing circuitry 110 may include one or more circuits, processors, and/or hardware components. Processing circuitry 110 may implement any logic, functions or instructions to perform any of the operations described herein.

Processing circuitry 110 can include any type and form of executable instructions executable by any of the circuits, processors or hardware components. The executable instructions may be of any type including applications, programs, services, tasks, scripts, libraries processes and/or firmware. In some embodiments, the processing circuitry 110 includes an eye tracker 116, a body feature tracker 120, a virtual camera positioner 124, and an image renderer 128. Any of eye tracker 116, body feature tracker 120, virtual camera positioner 124, and image renderer 128 may be any combination or arrangement of circuitry and executable instructions to perform their respective functions and operations. At least some portions of processing circuitry 110 can be used to implement image processing executed using data obtained by sensors 104, and as described in greater detail below.

As discussed further herein, an eye tracking operation can include any function, operation, routine, logic, or instructions executed by system 100 or components thereof to track data regarding eyes of the user, such as positions or orientations (e.g., gaze directions) of the eyes of the user as the eyes of the user move during use of the client computing system. For example, the eye tracking operation can be performed using one or more sensors 104 and/or eye tracker 116. For example, the eye tracking operation can process eye tracking data 132 from sensor(s) 104 to determine various gaze information, such as an eye position, gaze direction, gaze vector, focal point, gaze location, point of view, etc., shown as gaze vector 136 and gaze location 138 of eye(s) of the user.

In some embodiments, the eye tracking operation can be performed using eye tracker 116 that is implemented using a portion of processing circuitry 110 that is coupled with, mounted to, integral with, implemented using a same circuit board as, or otherwise provided with one or more sensors 104 that detect sensor data regarding the eyes of the user. In some embodiments, eye tracker 116 receives sensor data by a wired or wireless connection from the one or more sensors 104 that are configured to detect sensor data regarding the eyes of the user (e.g., images of the eyes of the user). For example, eye tracker 116 can be implemented using the same processing hardware as at least one of body feature tracker 120, and/or image renderer 128. Various such combinations of sensor hardware of sensors 104 and/or processing hardware of processing circuitry 110 may be used to implement the eye tracking operation.

Eye tracker 116 can generate or determine the gaze information (e.g., gaze vector 136 and/or gaze location 138) in various manners. For example, eye tracker 116 can process eye tracking data 132 to identify one or more pixels representing at least one of a position or an orientation of one or more eyes of the user. Eye tracker 116 can identify, using eye tracking data 132, gaze vector 136, and/or gaze location 138 based on pixels corresponding to light (e.g., light from light sources/light emitting diodes/actuators of sensors 104, such as infrared or near-infrared light from actuators of sensors 104, such as 850 nm light eye tracking) reflected by the one or more eyes of the user. Eye tracker 116 can determine gaze vector 136, gaze location 138, and/or eye position by determining a vector between a pupil center of one or more eyes of the user and a corresponding reflection (e.g., corneal reflection).

Gaze vector 136 can include position data such as at least one of a position or an orientation of each of one or more eyes of the user. The position data can be in three-dimensional space, such as three-dimensional coordinates in a Cartesian, spherical, or other coordinate system. Gaze vector 136 can include position data including a gaze direction of one or more eyes of the user. Gaze location 138 can include position data such as a focal point location on a display 112. In some embodiments, eye tracker 116 includes a machine learning model. The machine learning model can be used to generate eye position, gaze vector 136, and/or gaze location 138 based on eye tracking data 132.

Similarly, a body feature tracking operation can include any function, operation, routine, logic, or instructions executed by system 100 or components thereof to track data regarding any body feature (e.g., the head) of the user, such as a position or orientation of the body feature of the user as the body feature of the user moves during use of the client computing system. For example, the body feature tracking operation can be performed using one or more sensors 104 and/or body feature tracker 120. In some instances, the body feature tracking operation may be a head tracking operation that can be used to process body feature tracking data 140 from sensor(s) 104 to determine a head position, a head tilt direction (e.g., yaw, pitch, and/or roll), and/or a head outline location, shown as body feature information 144 of the user.

In some embodiments, the head tracking operation can be performed using body feature tracker 120 that is implemented using a portion of processing circuitry 110 that is coupled with, mounted to, integral with, implemented using a same circuit board as, or otherwise provided with one or more sensors 104 that detect sensor data regarding the head of the user. In some embodiments, body feature tracker 120 may receive sensor data by a wired or wireless connection from the one or more sensors 104 that are configured to detect sensor data regarding the head of the user (e.g., images of the head of the user). For example, body feature tracker 120 can be implemented using the same processing hardware as at least one of eye tracker 116 and/or image renderer 128. Various such combinations of sensor hardware of sensors 104 and/or processing hardware of processing circuitry 110 may be used to implement the head tracking operation.

Body feature tracker 120 can generate body feature information 144 in various manners. For example, body feature tracker 120 can process body feature tracking data 140 to identify or localize at least a portion of a head inside an image, and to determine a position or an orientation of the head (or various identified features of the head) of the user. For example, body feature tracker 120 can identify, using body feature tracking data 140, body feature information 144 based on various facial features (e.g., left eye, right eye, nose, left mouth corner, and right mouth corner) within the images. Body feature information 144 can include position data indicating a position of the center point of the head (or various identified features of the head) of the user within an image. The position data can be in three-dimensional space, such as three-dimensional coordinates in a Cartesian, spherical, or other coordinate system.

Body feature information 144 can further include orientation data including a head tilt direction and a head tilt degree of the head of the user. In some instances, the position data and the orientation data may be combined or used to collectively define a gaze direction, which may be used with or in place of the gaze information determined by the eye tracker 116. Similarly, based on the center point of the head, the determined gaze direction, and depth information received from the sensors 104, in some embodiments, the body feature tracker 120 may determine an estimated gaze location and an estimated gaze vector, similar to the gaze location 138 and the gaze vector 136 described above. In some embodiments, body feature tracker 120 includes a machine learning model. The machine learning model can be used to generate body feature information 144 based on body feature tracking data 140.

It should be appreciated that the aforementioned "head tracking operation" may be similarly applied to track various other features of a user's body (e.g., hand tracking, body or torso tracking, face tracking. For example, in some embodiments, the head tracking operation may be supplemented or replaced by various other body feature tracking operations. For example, the body feature tracking operations may utilize a body tracker having similar functionality to the body feature tracker 120, discussed above, to process various body feature tracking data to identify or localize one or more different body features. The body tracker may then identify body feature information, similar to the body feature information 144, based on various body features within the images. The body feature information may similarly include position data indicating a position of the various identified features of the body of the user within an image, as well as orientation data including a body feature tilt direction and tilt degree of the body feature of the user.

Further, it should be appreciated that the aforementioned "head tracking operation" may be similarly applied to track human movement generally, various room or scene features, social interactions, or any other desired features to be used by the virtual camera positioner 124 or the image renderer 128, as deemed necessary or desirable for a given application.

Processing circuitry 110 includes virtual camera positioner 124 (FIG. 1), according to some embodiments. Virtual camera positioner 124 is configured to receive gaze vector 136 from eye tracker 116 and body feature information 144 from body feature tracker 120, according to some embodiments. In some instances, virtual camera positioner 124 is further configured to receive input from the user through a user input 146 (e.g., via a keyboard, mouse, touchscreen) associated with the client computer system. For example, in some embodiments, the user may provide a requested virtual camera position including a requested camera location and a requested angular orientation of the virtual camera. Regarding the requested angular orientation of the virtual camera, the user may provide a first requested camera angle with respect to a first axis of the display and a second requested camera angle with respect to a second axis of the display 112. In some embodiments, the first and second axes may be substantially perpendicular to each other. For example, in some embodiments, the first and second axes may be vertical and horizontal axes of the display 112, respectively. In other embodiments, the first and second axes may be defined differently, as desired for a given application. Accordingly, in some embodiments, the user may selectively move the virtual camera by inputting the requested camera location and the requested angular orientation.

In some embodiments, virtual camera positioner 124 is configured to perform a virtual camera positioning operation. For example, virtual camera positioner 124 is configured to set, define, determine, and/or establish a virtual camera position 148. The virtual camera position 148 includes data regarding a corresponding position on or proximate display(s) 112 (e.g., a virtual camera location) and an angular orientation of the virtual camera with respect to display(s) 112. In some embodiments, the virtual camera position 148 is different from positions of the plurality of sensors 104, thereby allowing for the creation of an image from the perspective of a virtual camera that is at a location where no physical camera exists, as described further herein. Further, in some instances, the virtual camera position 148 may be such that the virtual camera provides a rendered image that is non-perpendicular to the display 112.

In some instances, virtual camera positioner 124 establishes the virtual camera position 148 based on gaze vector 136, as will be discussed below. In some instances, the virtual camera positioner 124 establishes the virtual camera position 148 based on the requested virtual camera position provided by the user. In these instances, the virtual camera positioner 124 sets a virtual camera location to the requested camera location, a first virtual camera angle (with respect to the first axis of the display 112) to the first requested camera angle, and a second virtual camera angle (with respect to the second axis of the display 112) to the second requested camera angle. In some embodiments, the virtual camera positioner 124 establishes the virtual camera position 148 based on any combination of the gaze vector 136, the body feature information 144, the manually selected or requested virtual camera position, a reference or preset virtual camera position, or any other suitable bases as desired for a particular application.

Virtual camera positioner 124 provides virtual camera position 148 to image renderer 128 for use in generating a rendered image 152, according to some embodiments. In some embodiments, virtual camera positioner 124 redefines the virtual camera position 148 periodically or dynamically (e.g. upon request, automatically, or continuously) based on an updated or new gaze vector 136, an updated or new body feature information 144, input from the user, or various other received data or inputs.

Processing circuitry 110 further includes image renderer 128, according to some embodiments. In some embodiments, image renderer 128 is configured to perform an image rendering operation. For example, image renderer 128 is configured to receive virtual camera position 148 from virtual camera positioner 124 and use virtual camera position 148 to generate a rendered image 152 based on the image data 156 and the images 108. The rendered image 152 may then be provided to one or more display(s) 112. For example, in some embodiments, image data 156 comprises various images 108 a . . . k, as well as pertinent information (e.g., view information, location of the associated sensor 104) for each image 108, and image renderer 128 is configured to merge images 108 a . . . k to create a virtual image (e.g., rendered image 152) from the perspective of a virtual camera at the virtual camera position 148, as will be discussed further herein.

Image renderer 128 is a 3D image renderer or 2D image renderer, according to some embodiments. Image renderer 128 uses image related input data to process, generate and render display or presentation images to display or present on one or more display devices, such as via the display of a client computing device, according to some embodiments. Image renderer 128 generates or creates 2D images of a scene or view for display on display 112 and represents the scene or view from the perspective of the virtual camera position 148, according to some embodiments. The display or presentation data (e.g., image data 156) to be rendered includes information from images taken from various views, according to some embodiments. Accordingly, image renderer 128 receives images 108, eye tracking data 132, virtual camera position 148, and head tracking data 150 and generates display images using images 108.

Image renderer 128 can render frames of display data to be provided to one or more displays 112. Image renderer 128 can render frames of image data sequentially in time, such as corresponding to times at which images are captured by the sensors 104. Image renderer 128 can render frames of display data based on changes in position and/or orientation of the user with respect to sensors 104 (e.g., the client computing system). The image renderer 128 and/or the processing circuitry 110 is configured to continuously transmit rendered images to a display (or multiple displays) of another user's (or multiple users') client computing system to allow for video communication, as will be described further herein. For example, the processing circuitry 110 may be communicably coupled to communications circuitry (e.g., communications circuitry 212, described below with reference to FIG. 2), which may transmit the rendered images to another user's (or multiple users') client computing system (e.g., remote user device 204, also described below with reference to FIG. 2) via a network to allow for video communication. Although image renderer 128 is shown as part of processing circuitry 110, the image renderer may be formed as part of other processing circuitry of a separate device or component, such as a separate server or a host computing system.

In some embodiments, image renderer 128 can perform foveated rendering based on depth information and/or the head (or body) tracking operation. For example, in some embodiments, processing circuitry 110 can identify objects within the image that are within a predetermined distance from the corresponding display 112 and objects within the image that are beyond the predetermined distance from the corresponding display 112. Processing circuitry 110 can then generate the display images to have a lower quality (e.g., resolution, pixel density, frame rate) in the regions of the image where the object is beyond the predetermined distance from the display 112, as compared to the quality of the regions of the image where the object(s) are within the predetermined distance from the display 112.

In some embodiments, processing circuitry 110 can identify a head, face, and/or various other body features of the user, and can generate the display images to have a lower quality in the regions of the image that are outside of the identified features of the user. In some embodiments, the processing circuitry 110 can generate the display images based on both a predetermined distance from the display 112 and the identified features of the user. For example, processing circuitry 110 may set the predetermined distance based on the identified features of the user, thereby allowing for the generated image to have a higher quality in regions where object(s) are at a similar distance from the display as the user. By providing foveated rendering, processing demand associated with operation of any client user devices (e.g., client user device 202 or remote user device 204) may be reduced. Specifically, because the processes described herein include the merging of a plurality of images and multiple streams of image data, providing foveated rendering may significantly reduce processing demand in creating the image from the perspective of the virtual camera.

As illustrated, system 100 can include one or more displays 112. The one or more displays 112 can be any type and form of electronic visual display. The displays may have or be selected with a predetermined resolution and refresh rate and size. The one or more displays can be of any type of technology such as LCD, LED, ELED or OLED based displays. Displays 112 may have a refresh rate the same or different than a rate of refresh or frame rate of processing circuitry 110 or image renderer 128 or the sensors 104. In some instances, the displays 112 may each be associated with one or more client computing systems of separate users, as will be described further below.

Referring now to FIG. 2, in some implementations, a video communication system 200 can be used to implement system 100. Video communication system 200 includes a client user device 202, at least one remote user device 204, and a server 206. In some instances, the client user device 202, the at least one remote user device 204, and the server 206 are in communication with each other and connected by a network 208. The network may be any combination of a local area network (LAN), an intranet, the Internet, or any other suitable communications network.

The client user device 202 and the at least one remote user device 204 may be substantially similar. In some embodiments, the client user device 202 and the remote user device 204 may be similar devices used by two users communicating with each other using the video communication system 200 via the network 208. For example, the client user device 202 may be a sending user device associated with a sending user and the at least one remote user device 204 may be a receiving user device associated with a receiving user. Accordingly, it should be understood that the following description of the client user device 202 may also be applied to the at least one remote user device 204.

The client user device 202 includes a device body 210, a plurality of sensors 104, and a display 112. In some embodiments, the plurality of sensors 104 includes a left sensor 104*a* (e.g., left image capture device), a right sensor 104*b* (e.g., right image capture device), a top sensor 104*c* (e.g., top image capture device), bottom sensor 104*d* (e.g., bottom image capture device), eye tracking sensors 104*e*, 104*f*, and head tracking sensors 104*g*, 104*h*.

In some embodiments, the sensors 104*a* . . . *f* can be mounted to or integrated in the device body 210. In some embodiments, the sensors 104*a* . . . *f* can be separate or remote sensors configured to communicate with the client user device 202 (or the remote user device 204) through a wired or wireless connection. The left sensor 104*a* can capture first images corresponding to a first view (e.g., left view) and the right sensor 104*b* can capture images corresponding to a second view (e.g., right view). Top sensor 104*c* can capture images corresponding to a third view (e.g., top view) and bottom sensor 104*d* can capture images corresponding to a fourth view (e.g., bottom view). The third and fourth views may be different than the first and second views. For example, top sensor 104*c* and bottom sensor 104*d* can be positioned between the left sensor 104*a* and the right sensor 104*b* and above and below, respectively, a midline between the left sensor 104*a* and the right sensor 104*b*. This can enable top sensor 104*c* and bottom sensor 104*d* to capture images with depth information that may not be readily available to be extracted from the images captured by left and right sensors 104*a*, 104*b*. For example, it may be difficult for depth information to be effectively extracted from images captured by left and right sensors 104*a*, 104*b* in which edges (e.g., an edge of a table) are parallel to a midline between left and right sensors 104*a*, 104*b*. Top sensor 104*c* and bottom sensor 104*d*, being spaced from the midline, can capture the third image and the fourth image to have different perspectives, and thus enable different depth information to be extracted from the third image and the fourth image, than readily available from the left and right sensors 104*a*, 104*b*. In some embodiments, one or more of the sensors 104 may further include a depth sensor. The depth sensor may utilize structured light, time-of-flight, or any other suitable type of depth sensing technology.

It should be appreciated that the arrangement of sensors 104*a* . . . *f* on device body 210 is provided as an example and is in no way meant to be limiting. For example, as alluded to above, the device body 210 may take any of a plurality of form factors, and as such, sensors 104*a* . . . *f* may be arranged differently on different form factors, while still being capable of the methods and processes described herein. Further, the number of sensors 104*a* . . . *f* illustrated on the device body 210 is also provided as an example. In some instances, the device body 210 may include as few as two sensors (e.g., sensor 104*a* and sensor 104*b*). In some other instances, the device body 210 may include as many sensors as deemed necessary or desirable for a given intended use. For example, in some instances, the device body 210 may include four sensors, ten sensors, fifty sensors, etc. Generally, as the number of sensors on a given device body increases, the number of captured imaging perspectives increases, allowing for improved image processing capabilities.

Further, as alluded to above, in some embodiments, the sensors 104*a* . . . *f* may be separate from or remote from the device body 210. For example, in some embodiments, a plurality of sensors may be arranged within a room (e.g., an office, a video conference room) around a user device (e.g., client user device 202, remote user device 204), and the plurality of sensors may be in communication with the user device to perform the functions and methods described herein. Accordingly, there may be any number of sensors integrated with or in communication with the client user device 202 (or the remote user device 204), as desired for a given application.

Client user device 202 can include processing circuitry 110, which can perform at least some of the functions described with reference to FIG. 1, including receiving sensor data from sensors 104*a* . . . *f*, which may be any type of imaging devices (e.g., cameras, eye tracking sensors, head tracking sensors), and processing the received images/data to calibrate and/or perform an eye tracking operation, a head tracking operation, a virtual camera positioning operation, and an image rendering operation.

Client user device 202 can include communications circuitry 212. Communications circuitry 212 can be used to transmit electronic communication signals to and receive electronic communication signals from at least one of the remote user device 204 (or multiple remote user devices) or the server 206. Communications circuitry 212 can communicate via network 208, local area networks (e.g., a building LAN), wide area networks (e.g., the Internet, a cellular network), and/or conduct direct communications (e.g., NFC, Bluetooth). Communications circuitry 212 can include wired or wireless interfaces (e.g., jacks, antennas, transmitters, receivers, transceivers, wire terminals) for conducting data communications with various systems, devices, or networks. For example, communications circuitry 212 can include an Ethernet card and port for sending and receiving data via an Ethernet-based communications network. Communications circuitry 212 can include one or more wireless transceivers (e.g., a Wi-Fi transceiver, a Bluetooth transceiver, a NFC transceiver, a cellular transceiver). Accordingly, communications circuitry 212 can conduct wired and/or wireless communications. For example, communications circuitry 212 can establish wired or wireless connections with the at least one of the remote user device 204 (or multiple remote user devices) or server 206.

Client user device 202 can be deployed using different architectures. In some embodiments, the client user device 202 (and/or each of the one or more remote user devices 204) includes processing circuitry 110 that is configured to independently perform each of the operations and/or processes described herein. In some embodiments, the client user device 202 (and/or each of the one or more remote user devices) has portions of processing circuitry 110 that work in cooperation with or in conjunction with processing circuitry, or portions thereof, of a server computing device (e.g., server 206), which may be deployed remotely in a data center or cloud computing environment. Accordingly, the client user device 202 or any computing device working in conjunction with the client user device 202 may communicate with one or more servers in performing any of the functionality and operations described herein.

The client user device 202 and/or each of the one or more remote user devices 204 can be any type and form of general purpose or special purpose computing device in any form factor. For example, although shown as a tablet, device body 210 can have various form factors, such as a mobile or portable device (e.g., a phone, a tablet, a laptop, a smart watch or other wearable device), a desktop or personal computing (PC) device, or any other suitable computing device. As alluded to above, the client user device 202 and/or the remote user device 204 may be used to perform any portion of the image and rendering processing operations described in connection with FIGS. 1 and 2. The client user device 202 can further transmit and receive data (e.g., audio data and video data) with the remote user device 204 via network 208 to allow for video communication.

Server 206 can be any type of form of computing device that provides applications, functionality or services to client user device 202, one or more remote user devices 204, or any other devices acting as clients. Server 206 can be deployed in a data center or cloud computing environment accessible via one or more networks (e.g., network 208). The client user device 202 and/or remote user device 204 can use and leverage the computing power and resources of server 206. In some instances, the client user device 202 and/or remote user device 204 can implement any portion of the image and rendering processing operations described in connection with FIGS. 1 and 2. In some instances, server 206 can similarly include processing circuitry 110 configured to implement any portion of the image and rendering processing operations. In some instances, portions of the image and rendering processing operations may be performed by the client user device 202 and/or the remote user device 204, while portions not performed by client user device 202 or remote user device 204 may be performed by server 206. In some embodiments, server 206 may be used to update the client user device 202 and/or remote user device 204 with any updated to the applications, software, executable instructions and/or data on the client user device 202 and/or remote user device 204.

Gaze Vector, Gaze Location, and Virtual Camera Positioning

Figure 3:
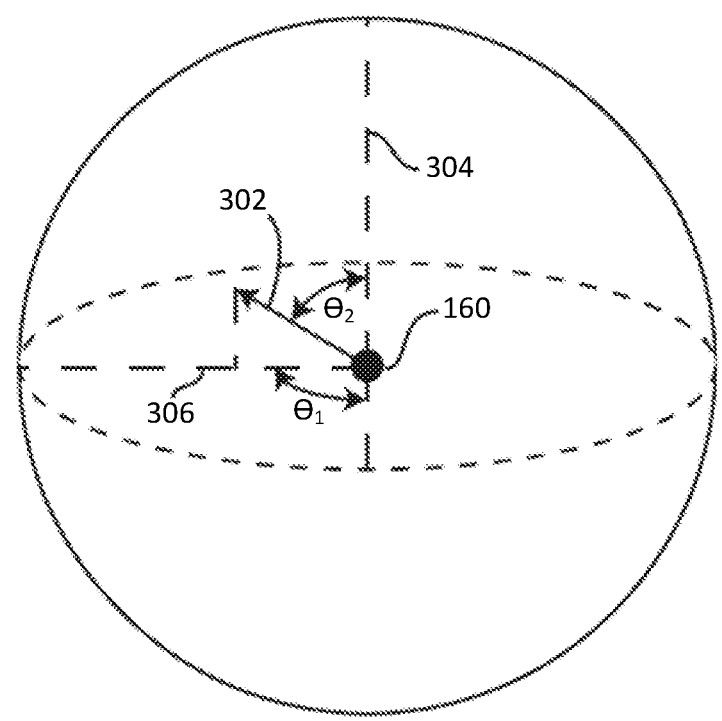
FIG. 3 is a spherical coordinate system showing a gaze vector of a user's eye, according to some embodiments.
Figure 4:
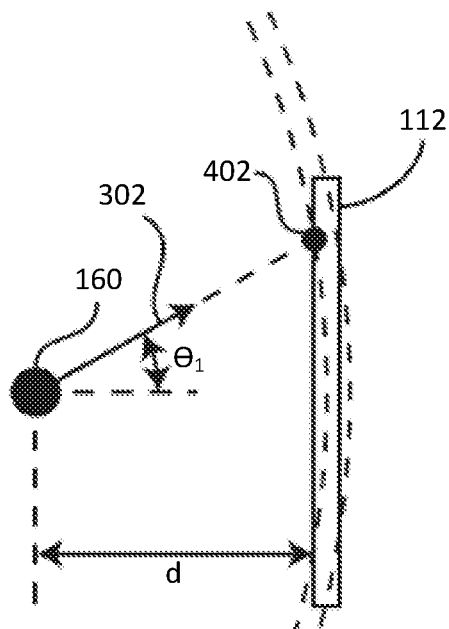
FIG. 4 is a top view of the gaze vector of FIG. 3 directed towards a display screen, according to some embodiments.
Figure 5:
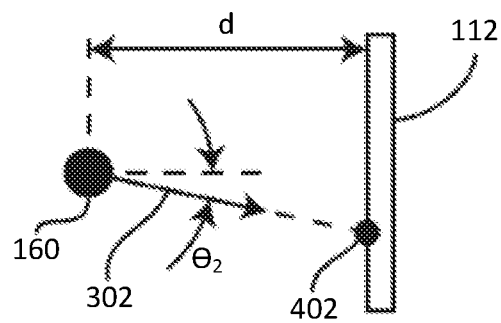
FIG. 5 is a side view of the gaze vector of FIG. 3 directed towards a display screen, according to some embodiments.

Referring now to FIGS. 3-5, the gaze vector 136 is shown in greater detail, according to some embodiments. Gaze vector 136 as used by processing circuitry 110 is represented graphically in FIGS. 3-5 as gaze vector 302, according to some embodiments. In some embodiments, the eye tracker 116 of the processing circuitry 110 is configured to receive the eye tracking data 132 and to determine the gaze vector 136 (or gaze vector 302) based, at least in part, upon the eye tracking data 132. It should be understood that while gaze vector 136 is represented in a spherical coordinate system, gaze vector 136 can also be represented in a Cartesian coordinate system, a polar coordinate system, a cylindrical coordinate system, etc., or any other coordinate system. Gaze vector 302 is used by processing circuitry 110 to determine a focal point or gaze location 402 of the user's eyes, according to some embodiments. In some embodiments, the processing circuitry 110 is configured to determine the gaze vector 136 (or gaze vector 302) and the gaze location 402 based, at least in part, on the eye tracking data 132 (e.g., received by the eye tracker 116) and/or the body feature tracking data 140 (e.g., received by the body feature tracker 120).

For example, referring to FIG. 3, a spherical coordinate system includes gaze vector 302, and a user's eye (or eyes) 160. Eye 160 is shown as a center point of the spherical coordinate system, and gaze vector 302 extends radially outwards from eye 160, according to some embodiments. In some embodiments, a direction of gaze vector 302 is defined by one or more angles, shown as angle $\theta_1$ (e.g., a first gaze angle) and angle $\theta_2$ (e.g., a second gaze angle). In some embodiments, angle $\theta_1$ represents an angular amount between gaze vector 302 and a vertical axis 304 (e.g., a first axis). In some embodiments, angle $\theta_2$ represents an angular amount between gaze vector 302 and a horizontal axis 306 (e.g., a second axis). In some embodiments, vertical axis 304 and horizontal axis 306 are substantially perpendicular to each other and both extend through eye 160.

In some embodiments, eye tracker 116 of processing circuitry 110 is configured to determine values of both angle $\theta_1$ and angle $\theta_2$ based on eye tracking data 132. Eye tracker 116 can determine the values of angles $\theta_1$ and $\theta_2$ for both eyes 160, according to some embodiments. In some embodiments, eye tracker 116 determines the values of angles $\theta_1$ and $\theta_2$ and provides the angles to virtual camera positioner 124 as gaze vector 136 (or gaze vector 302).

Referring particularly to FIGS. 4 and 5 gaze vector 302 can be used to determine a location of a point of interest, a focal point, a gaze point, a gaze location, a point, etc., shown as gaze location 402 (e.g., gaze location 138). Gaze location 402 has a location on display 112, according to some embodiments. In some embodiments, gaze location 402 has an x location and a y location (e.g., a horizontal and a vertical location) on display 112. In some embodiments, gaze location 402 has a location in virtual space, real space, etc. In some embodiments, gaze location 402 has a two dimensional location. In some embodiments, gaze location 402 has a three-dimensional location. Gaze location 402 can have a location on display 112 relative to an origin or a reference point on display 112 (e.g., a center of display 112, a corner of display 112, etc.). Gaze location 402 and gaze vector 302 can be represented using any coordinate system, or combination of coordinate systems thereof. For example, gaze location 402 and/or gaze vector 302 can be defined using a Cartesian coordinate system, a polar coordinate system, a cylindrical coordinate system, a spherical coordinate system, a homogeneous coordinate system, a curvilinear coordinate system, an orthogonal coordinate system, a skew coordinate system, etc.

In some embodiments, virtual camera positioner 124 and/or eye tracker 116 are configured to use a distance d between the user's eye 160 and display 112. The distance d can be a known or sensed distance between the user's eye 160 and display 112, according to some embodiments. For example, sensors 104 can measure, detect, sense, identify, etc., the distance d between the user's eye 160 and display 112. In some embodiments, the distance d is a known distance based on a type or configuration of the client user device 202.

The distance d and the angles $\theta_1$ and $\theta_2$ can be used by eye tracker 116 to determine gaze vector 302/136. In some embodiments, eye tracker 116 uses the distance d and the angles $\theta_1$ and $\theta_2$ to determine the location of gaze location 402. In some embodiments, eye tracker 116 provides the distance d and the angles $\theta_1$ and $\theta_2$ to virtual camera positioner 124. Virtual camera positioner 124 then uses the distance d and the angles $\theta_1$ and $\theta_2$ to determine the location of gaze location 402 relative to a reference point on display 112.

FIG. 4 is a top view of display 112 and the user's eye 160, according to some embodiments. FIG. 4 shows the angle $\theta_1$ with respect to a first axis (e.g., the vertical axis 304), according to some embodiments. Likewise, FIG. 5 is a side view of display 112 and the user's eye 160 and shows the angle $\theta_2$ with respect to a second axis (e.g., the horizontal axis), according to some embodiments. Virtual camera positioner 124 and/or eye tracker 116 use the distance d and the angles $\theta_1$ and $\theta_2$ to determine the position/location of gaze location 402, according to some embodiments. In some embodiments, virtual camera positioner 124 uses the position/location of gaze location 402 to define virtual camera position 148. It should be understood that while display 112 is shown as a generally flat display screen, in some embodiments, display 112 is a curved, arcuate, etc., display screen. A rectangular display screen is shown for ease of illustration and description only. Accordingly, all references to "local positions," "local coordinates," "Cartesian coordinates," etc., of display 112 may refer to associated/corresponding angular values of angle $\theta_1$ and/or angle $\theta_2$.

In some instances, virtual camera positioner 124 is configured to set the virtual camera position 148 based on the angles $\theta_1$ and $\theta_2$ and the gaze location 402. For example, in some embodiments, the virtual camera positioner 124 establishes the virtual camera position 148 by setting the virtual camera location at the gaze location 402, the first virtual camera angle at the angle $\theta_1$ (with respect to the display 112), and the second virtual camera angle at the angle $\theta_2$ (with respect to the display 112). Accordingly, the virtual camera position 148 is established such that the virtual camera is positioned at the gaze location and is oriented such that the virtual camera is directed toward or "pointed" directly at the eye 160 of the user. In the instance that the user is looking off of the screen, the virtual camera positioner 124 may set the virtual camera location to a location on the display 112 corresponding to or closest to the gaze location 402.

Image Processing

Figure 6:
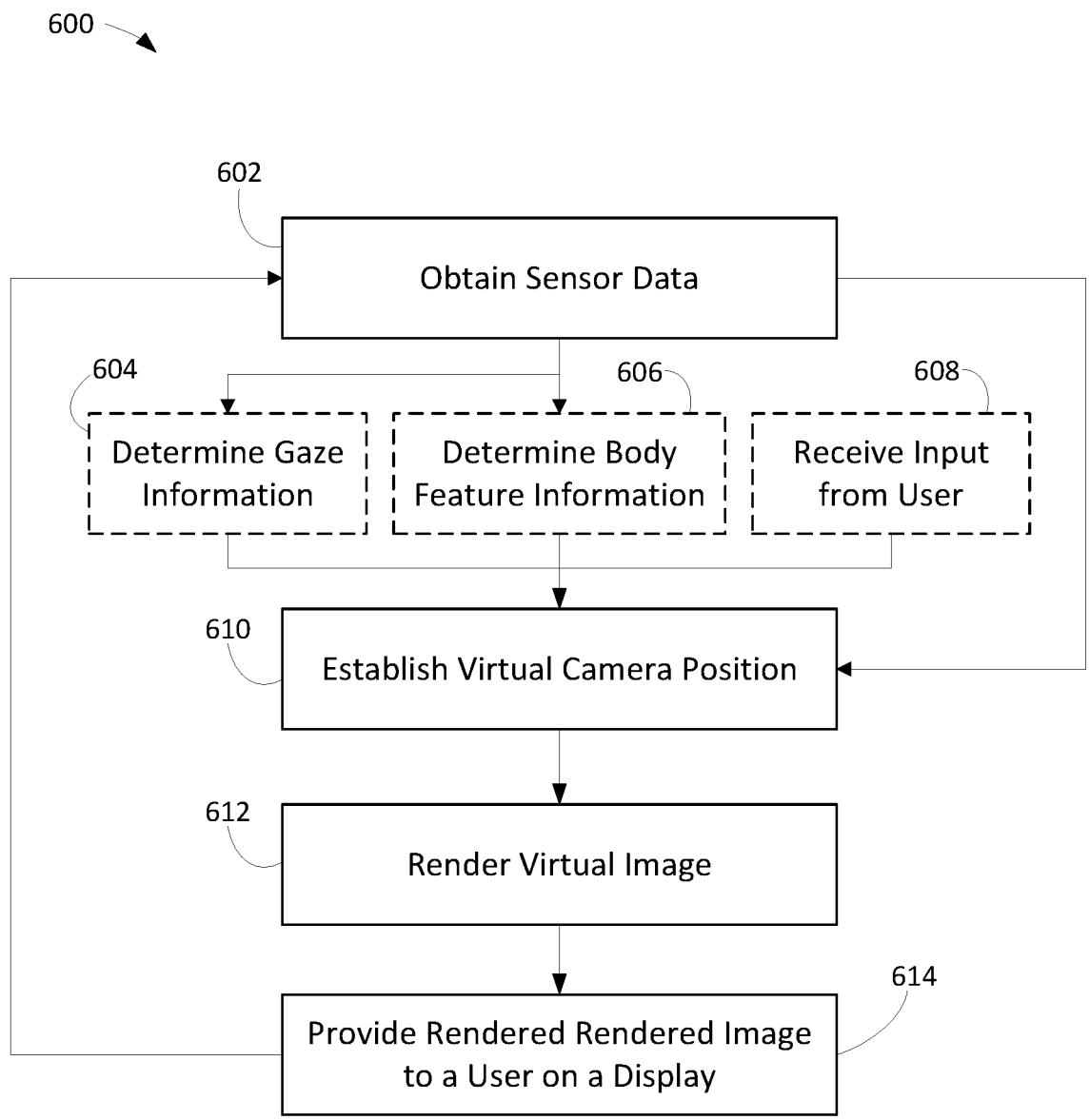
FIG. 6 is a flow diagram of a process for dynamically creating a virtually-rendered image to be provided to a display screen from the perspective of a virtual camera, according to some embodiments.

Referring particularly to FIG. 6, a process 600 for processing image data captured by a plurality sensors to dynamically create a virtually-rendered image from the perspective of a virtual camera is shown, according to some embodiments. Process 600 includes steps 602-614 and is performed by system 100, system 200, etc., to combine image data from the plurality of sensors 104 a . . . j to provide a virtually-rendered image from the perspective of a virtual camera, according to some embodiments. In some embodiments, process 600 is used during a video communication session. For example, process 600 allows for the virtual camera to be placed and used during a video communication session to provide a more realistic conversational experience for the users.

In some embodiments, the virtual camera may be placed in the center of a display being used during the video communication session. That is, image data obtained from a plurality of physical (or real) sensors may be combined and morphed together into a virtually-rendered image appearing to be taken from a location of a virtual camera in the center of the display, which may be different than the locations of any of the physical (or real) sensors. In some embodiments, the virtual camera position may be selectively moved in response to an input from a user. For example, the user may input a requested virtual camera position and a requested virtual camera angular orientation (e.g., a first virtual camera angle with respect to the display and a second virtual camera angle with respect to the display), and the virtual camera may be positioned based on the requested virtual camera position and requested virtual camera angular orientation. In this instance, image data obtained from the plurality of physical (or real) sensors may similarly be combined and morphed together into a virtually-rendered image appearing to be taken from the virtual camera at the virtual camera position and angular orientation.

In some embodiments, the virtual camera may be dynamically moved to follow a focal point and/or gaze direction of the user, such that the virtual camera continuously provides imagery appearing to be taken from a camera pointed directly back at the user's eyes. Thus, the processes and methods described herein (e.g., process 600) may allow for users to make virtual "eye contact" through their respective displays, thereby providing a more realistic communication experience. For example, during a video communication session, a first user may look at a displayed image of a second user's eyes on the first user's display (e.g., not directly at any physical sensor), and an image provided to the second user will appear as though the first user is looking directly into the camera. That is, the image provided to the second user will appear as though the first user is looking directly at the second user, similar to looking through a window.

Process 600 includes obtaining sensor data (step 602), determining a gaze vector (step 604), determining a body state vector (step 606), receiving input from a user (step 608), establishing a virtual camera position (step 610), rendering a virtual image (step 612), and providing the rendered virtual image to a user on a display (step 614), according to some embodiments. It should be appreciated that process 600 is meant to be exemplary. The particular order of the steps provided may be altered or changed without departing from the scope of the present disclosure. Further, it should be appreciated that some of the steps provided are optional, depending on the intended use and/or the limitations of a given device. Some of these optional steps have been indicated as such below.

Regarding step 602, in some embodiments, the sensor data includes gaze direction data and/or image data 156. In some embodiments, the gaze direction data indicates the direction of the user's gaze. In some embodiments, the gaze direction data includes eye tracking data 132 and/or body feature tracking data 140. In some embodiments, eye tracking data 132 indicates a position of a user's eyes, a position of the user's pupils, an orientation of the user's eyes, etc. In some embodiments, body feature tracking data 140 includes head position, head tilt direction, and/or a head outline location. In some embodiments, step 602 is performed by one or more of sensors 104. For example, step 602 may be performed by one or more sensors 104 of the client user device 202 or one or more sensors 104 of the remote user device 204.

In some embodiments, process 600 optionally includes determining gaze information (e.g., gaze vector and/or gaze location) of the user (step 604). In some embodiments, step 604 may be performed by the processing circuitry 110 (e.g., eye tracker 116) of the client user device 202, the remote user device 204, or the server 206 individually. In some embodiments, step 604 may be performed using any combination of the processing circuitry 110 of the client user device 202, the remote user device 204, and the server 206, such that step 604 may be executed in a distributed manner. For example, as described above, the processing circuitry 110 (e.g., eye tracker 116) may be configured to receive the eye tracking data 132 from the sensors 104. The eye tracker 116 may then be configured to perform the eye tracking operation discussed above. For example, the eye tracker 116 may be configured to determine the gaze vector 136 (or the gaze vector 302) and/or the gaze location 138 (or the gaze location 402). Once the eye tracker 116 has determined the gaze vector 136 (or the gaze vector 302) and the gaze location 138 (or the gaze location 402), the eye tracker 116 may provide the gaze vector 136 (or the gaze vector 302) and/or the gaze location 138 (or the gaze location 402) to the virtual camera positioner 124 of the client user device 202, the remote user device 204, and/or the server 206.

In some embodiments, process 600 optionally includes determining body feature information 144 of the user (step 606). In some embodiments, step 606 may be performed by the processing circuitry 110 (e.g., body feature tracker 120) of the client user device 202, the remote user device 204, or the server 206 individually. In some embodiments, step 604 may be performed using any combination of the processing circuitry 110 of the client user device 202, the remote user device 204, and the server 206, such that step 604 may be executed in a distributed manner. For example, as described above, in some embodiments, the processing circuitry 110 (e.g., body feature tracker 120) may be configured to receive the body feature tracking data 140 from the sensors 104. The body feature tracker 120 may then be configured to determine, generate, and/or establish the body feature information 144. For example, the body feature tracker 120 may perform the head tracking operation discussed above to determine, generate, and/or establish a head position, a head tilt direction, and/or a head outline location. In some other embodiments, the body feature tracker 120 may perform various other body feature tracking operations to determine or generate various other body feature information 144. Once the body feature tracker 120 has determined the body feature information 144, the body feature tracker 120 may provide the body feature information 144 to the virtual camera positioner 124 of the client user device 202, the remote user device 204, and/or the server 206.

In some embodiments, process 600 optionally includes receiving input from a user (step 608). In some embodiments, step 608 may be performed by the processing circuitry 110 of the client user device 202 or the remote user device 204. In some embodiments, step 608 may be performed by the processing circuitry 110 of the client user device 202 and the remote user device 204 (e.g., input is received from both the user of the client user device 202 and the user of the remote user device 204). For example, the processing circuitry 110 may receive input from the user through the user input 146. As alluded to above, the user may provide a requested virtual camera position including a requested camera location and a requested angular orientation of the virtual camera (e.g., a first requested virtual camera angle with respect to the first axis of the display 112 and a second requested virtual camera angle with respect to the second axis of the display 112). Once the user has provided the requested virtual camera position, the processing circuitry 110 may provide the requested virtual camera position to the virtual camera positioner 124 of the client user device 202, the remote user device 204, and/or the server 206.

The process 600 further includes establishing a virtual camera position 148 (step 610). In some embodiments, step 610 may be performed by the processing circuitry 110 (e.g., virtual camera positioner 124) of the client user device 202, the remote user device 204, or the server 206 individually. In some embodiments, step 610 may be performed using any combination of the processing circuitry 110 of the client user device 202, the remote user device 204, and the server 206, such that step 610 may be executed in a distributed manner. The virtual camera positioner 124 is configured to receive the gaze information (including the gaze vector 136 and the gaze location 138) from the eye tracker 116, the body feature information 144 from the body feature tracker 120, and/or the input from the user, and use the various received data to perform the virtual camera positioner operation, discussed above, to establish the virtual camera position 148. There are a variety of manners in which the processing circuitry 110 (e.g., the virtual camera positioner 124) may establish the virtual camera position 148.

For example, in some embodiments, where the virtual camera positioner 124 receives the gaze information from the eye tracker 116, the virtual camera positioner 124 may establish the virtual camera position 148 based on the gaze information. Specifically, the virtual camera positioner 124 may set the virtual camera location to the gaze location 138 (or gaze location 402), set the first virtual camera angle corresponding to the first gaze angle $\theta_1$, and set the second virtual camera angle corresponding to the second gaze angle $\theta_2$. Accordingly, the virtual camera positioner 124 may position the virtual camera such that the virtual camera is disposed directly where the user is looking and is pointed, directed, or oriented toward the eyes (or a location between the eyes) of the user. In some instances, when the user looks off-screen, the virtual camera positioner 124 may move the virtual camera location to correspond to the closest on-screen location of the display 112.

In some embodiments, where the virtual camera positioner 124 receives the body feature information 144 from the body feature tracker 120, the virtual camera positioner 124 may establish the virtual camera position 148 based on the body feature information. For example, if the body feature tracker 120 determines the estimated gaze location and the estimated gaze vector using the body feature tracking data 140 (e.g., head or face tracking data), the virtual camera positioner 124 may receive the estimated gaze location and the estimated gaze vector in the body feature information 144 and may set the virtual camera location to the estimated gaze location and the first and second virtual camera angles based on the estimated gaze vector. For example, the virtual camera position 148 may be established such that a plane of the user's face forms a perpendicular angle with an optical axis between the virtual camera and the plane of the user's face, with the optical axis being centered on the user's face. Accordingly, in some instances, the virtual camera positioner 124 may position the virtual camera based on various body features detected in an image. As such, in some embodiments, the virtual camera position 148 may be established based on non-eye related body feature information. In some embodiments, the virtual camera positioner 124 may establish the position of the virtual camera based on a combination of the gaze information and the body feature information 144.

In some embodiments, where the virtual camera positioner 124 receives input from the user via the user input 146, the virtual camera positioner 124 may establish the virtual camera position 148 based on the received input. For example, if the user provides the requested virtual camera position including the requested camera location and a requested angular orientation (e.g., the first requested camera angle and the second requested camera angle) of the virtual camera, the virtual camera position 148 may be established by setting the virtual camera location to the requested virtual camera location and setting the first and second virtual camera angles to the first and second requested camera angles, respectively.

In some instances, a user of the remote user device 204 (e.g., a receiving user) may provide a requested virtual camera position for the virtual camera of the client user device 202. In these instances, a user of the client user device 202 (e.g., a sending user) may receive a prompt on the display 112 of the client user device 202 asking whether to allow the receiving user to set or establish the virtual camera position 148. The sending user may then indicate via the user input 146 whether to allow the receiving user to set or establish the virtual camera position 148. Accordingly, in some embodiments, the virtual camera positioner 124 may establish the virtual camera position 148 of the virtual camera of the client user device 202 based on a requested virtual camera position provided by a user of the remote user device 204. Similarly, in some embodiments, the virtual camera positioner 124 may establish the virtual camera position 148 of the virtual camera of the remote user device 204 based on a requested virtual camera position provided by a user of the client user device 202.

In some instances, the user may provide the requested camera location and the requested angular orientation as a default camera position. For example, the virtual camera positioner 124 may be configured to dynamically move the virtual camera position 148 based on the gaze information and/or the body feature information 144, as discussed above, and when the user looks off-screen or moves out of view, the virtual camera positioner 124 moves the virtual camera to the default camera position. In other embodiments, the virtual camera positioner 124 may establish the position of the virtual camera based on a combination of the gaze information, the body feature information 144, and/or the received user input.

In some embodiments, the virtual camera positioner 124 may position the virtual camera at a preset or default location and orientation. For example, in some instances, the virtual camera positioner 124 may be preset or have a default set to position the virtual camera at the center of the display 112, facing directly outward from the display. Accordingly, in some embodiments, the virtual camera positioner 124 may establish the virtual camera position 148 by setting the virtual camera location to the center of the display 112 (e.g., of a sending user) and setting the first and second virtual camera angles such that an optical axis of the virtual camera is perpendicular to the display 112. In some instances, the user may periodically change the preset or default position of the virtual camera via the user input 146.

In any of the aforementioned configurations, the virtual camera positioner 124 may establish the virtual camera position 148 at a position different from positions of any of the plurality of sensors 104. Accordingly, the virtual camera may be placed in a position where there is no physical sensor or camera, in some embodiments.

It should be appreciated that the virtual camera positioner 124 may be employed in both a user computing device of a sending user (e.g., client user device 202) and a user computing device of a receiving user (e.g., remote user device 204). Accordingly, each user computing device may have a virtual camera that is positioned by a corresponding virtual camera positioner 124 based on gaze information and/or body feature information 144 of the sending user and/or the receiving user, respectively. Regardless, once the virtual camera positioner 124 has established the virtual camera position 148, the processing circuitry 110 (e.g., the virtual camera positioner 124) may provide the virtual camera position 148 to the image renderer 128 of the client user device 202, the remote user device 204, and/or the server 206.

The process 600 further includes rendering the virtual image (step 612). In some embodiments, step 612 may be performed by the processing circuitry 110 (e.g., image renderer 128) of the client user device 202, the remote user device 204, or the server 206 individually. In some embodiments, step 612 may be performed using any combination of the processing circuitry 110 of the client user device 202, the remote user device 204, and the server 206, such that step 612 may be executed in a distributed manner. The image renderer 128 is configured to receive the image data 156 from the plurality of sensors 104 and the virtual camera position 148 from the virtual camera positioner 124, and to morph, warp, and/or merge the image data 156 based on the virtual camera position 148 to create a rendered image from the perspective or viewpoint of a virtual camera at the virtual camera position 148.

Specifically, the perspective or the viewpoint of the virtual camera at the virtual camera position 148 may be the field of view that would be "captured" by a virtual camera located at the virtual camera location and pointed or directed in a desired angle (e.g., the first and second virtual camera angles) from the virtual camera location. As described herein, in some embodiments, the virtual camera position 148 may be continuously updated such that the virtual camera location is set to a gaze location of the user and the virtual camera is pointed or directed in a direction toward the eye(s) of the user. In this manner, the virtual camera may be or act similar to a virtual camera gimbal configured to provide the appearance that the user is always (or almost always) looking into the virtual camera. The processing of the image data 156 can be achieved using a variety of methods.

For example, various computational imaging approaches may be used to project two or more camera angles into a new virtual single camera position. This may be done using purely image based techniques or using an estimate of geometry and/or depth. In some instances, "model free" techniques may be used. That is, the image data 156 may be merged without making any assumptions regarding the scene being captured by the sensors 104. In some other instances, assumptions about the scene may be used (e.g., "model based" techniques). For instance, knowledge that the camera(s) (e.g., the sensors 104) are looking at a human face may be leveraged to aid in the processing of the various image data 156. This may provide improved quality of the rendered image 152.

When creating the rendered image 152, latency and computational complexity may be considered for a given application. For example, at 30 Hz frame rate, a typical latency tolerance may be approximately 3 frames before the latency goes above 100 milliseconds, which may be considered a maximum acceptable latency for many applications. As a general statement, high quality imagery may result in more computational requirements and, in some instances, increased latency. However, high quality imagery may provide improved or simplified compression between various users. Accordingly, varying techniques may be used based on computational capacity of the client user device, cost constraints, technical difficulty, and market viability, as determined for a given application. Further, in some embodiments, progressive compression may be used to account for different users using differing solutions (e.g., employed image processing techniques).

In some embodiments, an image-based approach or technique may be used to process the image data 156 to create the rendered image 152. For example, homographic computer vision techniques may be applied to relate image data 156 from the various sensors 104 to correlate the image data 156 based on which sensor 104 it was captured by and to map the image data 156 together to synthesize the image data 156 to generate the rendered image 152. For example, in some instances, this may be achieved using simultaneous localization and mapping (SLAM) techniques or algorithms. Further, inside-out or outside-in tracking may aid in the fusing of the multiple data streams provided to the image renderer 128 by fixing or tracing the position of various features within the images 108 provided to the image renderer 128. The images 108 may thus be warped, morphed, and/or otherwise merged into the rendered image 152 generated by the image renderer 128. In some embodiments, the image renderer 128 may generate a rendered image 152 that is two-dimensional and highly compressible.

In some embodiments, a geometry-based and/or depth based approach or technique may be used to process the image data 156 to create the rendered image 152. For example, depth information provided by the plurality of sensors 104 may be used to reconstruct a virtual geometry of the scene being imaged. By reconstructing the virtual geometry of the scene from multiple angles, the virtual geometry reconstructions can be combined into a combined geometry reconstruction. RGB (red, green, and blue) data provided from the plurality of sensors may then be applied to the combined geometry reconstruction. The reconstruction having the RGB data applied thereto (e.g., the colored geometric reconstruction) may be virtually oriented to match the perspective or viewpoint of the virtual camera, and a two-dimensional image may be generated (e.g., by compressing the three-dimensional model at the set orientation) to create the rendered image 152.

In some instances, model-based approaches may be used to aid in the processing of the image data 156 to create the rendered image 152. In these instances, an assumption about the geometry of the user may be made to aid in the rendering of the rendered image 152. In some embodiments, a request proxy geometry or general geometric model may be initially applied or provided to the image renderer 128. For example, the image renderer 128 may start with the general geometric model, and may subsequently alter or change the general geometric model to correlate or correspond to received depth information provided by the plurality of sensors 104. As such, the image renderer 128 does not need to fully reconstruct the geometry of the scene being imaged, which may reduce associated computational burdens. Similarly, in some embodiments, face tracking may be used to build an initial warping mesh for the image-based approach described above.

Additionally, as described above, foveated rendering may additionally be used lower computational burdens placed on the client computing device. For example, when rendering the rendered image 152, the image renderer 128 may be configured to identify regions of the images 108 that are not within a predetermined distance from the sensors 104 and/or do not contain the user (e.g., non-essential regions). The image renderer 128 may then be configured to automatically blur or provide lower quality imaging in the non-essential regions of the rendered image 152. As such, the computational burdens associated with rendering high quality imagery in the non-essential regions of the rendered image 152 may be reduced. Further, the image renderer 128 may identify the non-essential regions in the initial images 108 provided from the plurality of sensors 104, and may put less emphasis on those regions during the warping, merging, and/or morphing of the images 108 into the rendered image 152. Accordingly, the computation burdens associated with warping, merging, and/or morphing the non-essential regions may be reduced.

It should further be appreciated that, in some embodiments, the various approaches discussed above, as well as various other imaging techniques, may be used interchangeably or in combination with one another to provide improved image quality and/or further lower computational burdens placed on the client computing device, as desired for a given application or a given user computing device. Further, the various techniques described herein may be selectively or automatically calibrated to reduce image error and/or to improve image quality. For example, in some instances, aberration correction may be applied to the images 108 prior to, during, or after the rendered image 152 has been generated.

Process 600 further includes providing or transmitting the rendered image 152 to a user on a display 112 (step 614). In some embodiments, step 614 may be performed by the processing circuitry 110 of the client user device 202, the remote user device 204, or the server 206 individually. In some embodiments, step 614 may be performed using any combination of the processing circuitry 110 of the client user device 202, the remote user device 204, and the server 206, such that step 614 may be executed in a distributed manner. As described above, the processing circuitry 110 is communicably coupled to communications circuitry 212. Accordingly, once the image renderer 128 has generated the rendered image 152, the processing circuitry 110 is configured to transmit the rendered image 152 (e.g., using the communications circuitry 212) to a display of the client user device 202 and/or the remote user device 204 via the network 208.

Once process 600 has concluded (e.g., the rendered image 152 has been transmitted to the client user device 202 and/or the remote user device 204), the process 600 starts over with obtaining sensor data (step 602). Accordingly, in some embodiments, each of the steps 602-614 may be performed continuously. As such, the virtual camera position 148 may be updated continuously, responsive to changes in imagery captured by the plurality of sensors 104, or responsive to received input from the user.

Server System

Figure 7:
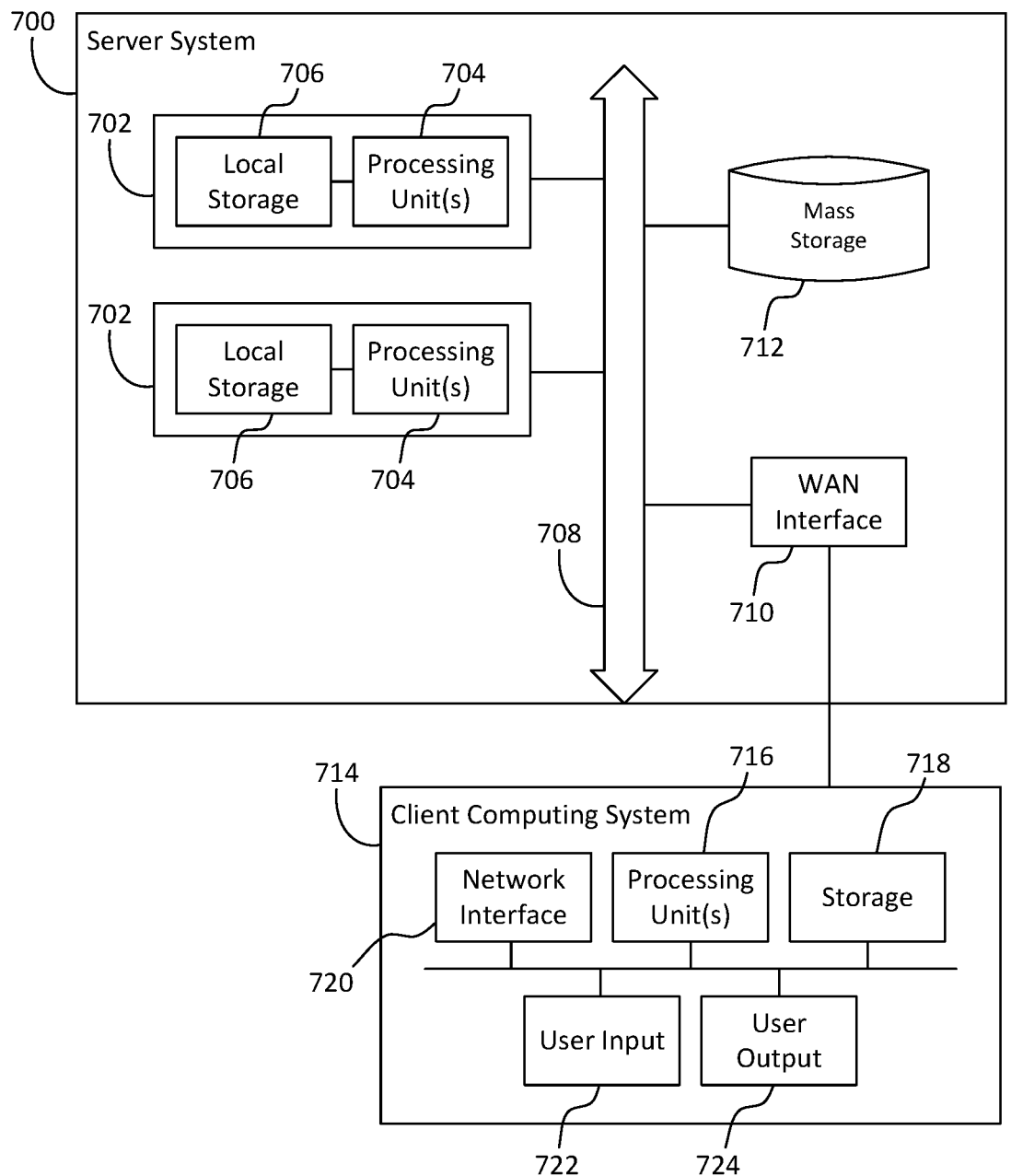
FIG. 7 is a block diagram of a computing environment that the systems of FIGS. 1 and 2 can be implemented in, according to some embodiments.

Various operations described herein can be implemented on computer systems. FIG. 7 shows a block diagram of a representative server system 700 and client computer system 714 usable to implement the present disclosure. Server system 700 or similar systems can implement services or servers described herein or portions thereof. Client computer system 714 or similar systems can implement clients described herein. Each of systems 100, 200 and other methods and processes described herein can incorporate features of systems 700, 714.

Server system 700 can have a modular design that incorporates a number of modules 702 (e.g., blades in a blade server). While two modules 702 are shown, any number can be provided. Each module 702 can include processing unit(s) 704 and local storage 706.

Processing unit(s) 704 can include a single processor, which can have one or more cores, or multiple processors. Processing unit(s) 704 can include a general-purpose primary processor as well as one or more special-purpose co-processors such as graphics processors, digital signal processors, or the like. Some or all processing units 704 can be implemented using customized circuits, such as application specific integrated circuits (ASICs) or field programmable gate arrays (FPGAs). Such integrated circuits execute instructions that are stored on the circuit itself. Processing unit(s) 704 can execute instructions stored in local storage 706. Any type of processors in any combination can be included in processing unit(s) 704.

Local storage 706 can include volatile storage media (e.g., conventional DRAM, SRAM, SDRAM, or the like) and/or non-volatile storage media (e.g., magnetic or optical disk, flash memory, or the like). Storage media incorporated in local storage 706 can be fixed, removable or upgradeable as desired. Local storage 706 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 704 need at runtime. The ROM can store static data and instructions that are needed by processing unit(s) 704. The permanent storage device can be a non-volatile read-and-write memory device that can store instructions and data even when module 702 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 706 can store one or more software programs to be executed by processing unit(s) 704, such as an operating system and/or programs implementing various server functions such as functions of system 100, system 200, or any other system, methods, or processes described herein, or any other server(s) associated with system 100, system 200, or any other systems, methods, or processes described herein.

"Software" refers generally to sequences of instructions that, when executed by processing unit(s) 704 cause server system 700 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 704. Software can be implemented as a single program or a collection of separate programs or program modules that interact as desired. From local storage 706 (or non-local storage described below), processing unit(s) 704 can retrieve program instructions to execute and data to process in order to execute various operations described above.

In some server systems 700, multiple modules 702 can be interconnected via a bus or other interconnect 708, forming a local area network that supports communication between modules 702 and other components of server system 700. Interconnect 708 can be implemented using various technologies including server racks, hubs, routers, etc.

A wide area network (WAN) interface 710 can provide data communication capability between the local area network (interconnect 708) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 706 can provide working memory for processing unit(s) 704, providing fast access to programs and/or data to be processed while reducing traffic on interconnect 708. Storage for larger quantities of data can be provided on the local area network by one or more mass storage subsystems 712 that can be connected to interconnect 708. Mass storage subsystem 712 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 712. Additional data storage resources may be accessible via WAN interface 710 (potentially with increased latency).

Server system 700 can operate in response to requests received via WAN interface 710. For example, one of modules 702 can implement a supervisory function and assign discrete tasks to other modules 702 in response to received requests. Conventional work allocation techniques can be used. As requests are processed, results can be returned to the requester via WAN interface 710. Such operation can generally be automated. WAN interface 710 can connect multiple server systems 700 to each other, providing scalable systems capable of managing high volumes of activity. Conventional or other techniques for managing server systems and server farms (collections of server systems that cooperate) can be used, including dynamic resource allocation and reallocation.

Server system 700 can interact with various user-owned or user-operated devices via a wide-area network such as the Internet. An example of a user-operated device is shown in FIG. 7 as client computing system 714. For example, client computing system 714 can communicate via WAN interface 710. Client computing system 714 can include conventional computer components such as processing unit(s) 716, storage device 718, network interface 720, user input device 722, and user output device 724.

Client computing system 714 can be implemented in a variety of form factors, such as, for example, a consumer device such as a smartphone, other mobile phone, tablet computer, wearable computing device (e.g., smart watch, eyeglasses), desktop computer, laptop computer, and so on. In some instances, the client user device 202 and/or the remote user device 204 may comprise, in part or in whole, the client computing system 714.

Processor 716 and storage device 718 can be similar to processing unit(s) 704 and local storage 706 described above. Suitable devices can be selected based on the demands to be placed on client computing system 714. For example, client computing system 714 can be implemented as a "thin" client with limited processing capability or as a high-powered computing device. Client computing system 714 can be provisioned with program code executable by processing unit(s) 716 to enable various interactions with server system 700 of a message management service such as accessing messages, performing actions on messages, and other interactions described above. Some client computing systems 714 can also interact with a messaging service independently of the message management service.

Network interface 720 can provide a connection to a wide area network (e.g., the Internet) to which WAN interface 710 of server system 700 is also connected. Network interface 720 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 722 can include any device (or devices) via which a user can provide signals to client computing system 714. Client computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, and so on.

User output device 724 can include any device via which client computing system 714 can provide information to a user. For example, user output device 724 can include a display to display images generated by or delivered to client computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Configuration of Exemplary Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act, or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical, or other positioning or orientation descriptions include variations within +/−10% or +/−10 degrees of pure vertical, parallel or perpendicular positioning. References to "approximately," "about," "substantially," or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method for using a virtual camera location to display image data to one device from another device associated with a plurality of cameras, the method comprising:
   receiving image data from a plurality of cameras associated with a second user device associated with a second user;
   determining a gaze vector of the second user based on received eye tracking data;
   establishing a virtual camera location different from positions of the plurality of cameras based on the gaze vector;
   setting a first virtual camera angle and a second virtual camera angle based on the gaze vector; and
   providing an image using the image data on a first user display of a first user device based at least on a viewpoint of the virtual camera location.

2. The method of claim 1, further comprising:
   receiving position data associated with at least one body part of the second user,
   wherein the viewpoint of the virtual camera location is further established based on the position data and the first virtual camera angle and the second virtual camera angle.

3. The method of claim 2, wherein the position data comprises data indicating a position of a feature of a head of the second user.

4. The method of claim 3, wherein
   determining the gaze vector of the second user includes determining a gaze location, a first gaze angle, and a second gaze angle,
   wherein the virtual camera location is established by setting the virtual camera location to correspond to the gaze location, and
   wherein the first virtual camera angle is set based at least on the first gaze angle and the second virtual camera angle is set based at least on the second gaze angle.

5. The method of claim 4, wherein the virtual camera location is established one of continuously or responsive to changes in imagery captured by the plurality of cameras.

6. The method of claim 1, wherein the viewpoint is determined using the virtual camera location, the first virtual camera angle with respect to a first axis, and the second virtual camera angle with respect to a second axis, the first axis being perpendicular to the second axis.

7. A method for using a virtual camera location to display image data to one device from another device associated with a plurality of cameras, the method comprising:
   receiving image data from a plurality of cameras associated with a second user device associated with a second user;
   receiving a requested virtual camera position from the second user;
   establishing a virtual camera location different from positions of the plurality of cameras based on the requested virtual camera position;
   setting a first virtual camera angle and a second virtual camera angle based on the requested virtual camera position.

8. The method of claim 7, wherein the requested virtual camera position is selectively movable by the second user.

9. The method of claim 1, wherein the viewpoint of the virtual camera location is at a non-perpendicular angle with respect to a surface of a second user display of the second user device and is established using the first virtual camera angle and the second virtual camera angle.

10. A system comprising:
a receiving user device associated with a receiving user and having a receiving user display;
a sending user device associated with a sending user and in communication with the receiving user device via a network, the sending user device having a sending user display, a plurality of sensors, and processing circuitry configured to:
receive image data from the plurality of sensors;
determine a gaze vector of the sending user based on received eye tracking data;
establish a virtual camera location of a virtual camera different from positions of the plurality of sensors based on the gaze vector;
set a first virtual camera angle and a second virtual camera angle of the virtual camera based on the gaze vector;
render an image based at least on the image data and a position of the virtual camera; and
transmit, via the network, the image to the receiving user device to be displayed on the receiving user display.

11. The system of claim 10, wherein the processing circuitry is further configured to combine the image data received from the plurality of sensors to render the image from a viewpoint of the virtual camera.

12. The system of claim 10, wherein the first virtual camera angle is with respect to a first axis, the second virtual camera angle is with respect to a second axis, and the first axis is perpendicular to the second axis and the virtual camera location has a virtual view defined by the first virtual camera angle and second virtual camera.

13. The system of claim 12, wherein the processing circuitry is further configured to:
receive position data associated with at least one body part of the sending user from at least one of the plurality of sensors indicating a position of a feature of a head of the sending user; and
wherein rendering the image is further based at least partially on the position data.

14. The system of claim 13, wherein determining the gaze vector of the sending user includes determining a gaze location, a first gaze angle, and a second gaze angle,
wherein the virtual camera location is established by setting the virtual camera location to correspond to the gaze location, and
wherein the first virtual camera angle is set based at least on the first gaze angle and the second virtual camera angle is set based at least on the second gaze angle.

15. A system comprising:
a receiving user device associated with a receiving user and having a receiving user display;
a sending user device associated with a sending user and in communication with the receiving user device via a network, the sending user device having a sending user display, a plurality of sensors, and processing circuitry configured to:
receive image data from the plurality of sensors;
receive a requested virtual camera position from the sending user;
establish a virtual camera location of a virtual camera different from positions of the plurality of sensors based on the requested virtual camera position;
set a first virtual camera angle and a second virtual camera angle of the virtual camera based on the requested virtual camera position;
render an image based at least on the image data and a position of the virtual camera; and
transmit, via the network, the image to the receiving user device to be displayed on the receiving user display.

16. A video communication device associated with a user comprising:
a plurality of sensors;
a display arranged between at least two of the plurality of sensors;
processing circuitry in communication with a network, the processing circuitry configured to:
receive image data from the plurality of sensors;
determine a gaze vector of the user based on received eye tracking data;
establish a virtual camera location of a virtual camera different from positions of the plurality of sensors based on the gaze vector;
set a first virtual camera angle and a second virtual camera angle of the virtual camera based on the gaze vector; and
render an image based on the image data and a position of the virtual camera; and
communications circuitry configured to transmit the image to a receiving user device via the network.

17. The video communication device of claim 16, wherein the processing circuitry is further configured to render the image by combining the image data received from the plurality of sensors to produce the image from a viewpoint of the virtual camera.

18. The video communication device of claim 16, wherein the first virtual camera angle is with respect to a first axis, the second virtual camera angle is with respect to a second axis, and the first axis is perpendicular to the second axis.

19. The video communication device of claim 18, wherein determining the gaze vector of the user includes determining a gaze location, a first gaze angle, and a second gaze angle,
wherein the virtual camera location is established by setting the virtual camera location to correspond to the gaze location, and
wherein the first virtual camera angle is set based on the first gaze angle and the second virtual camera angle is set based on the second gaze angle.

20. A video communication device associated with a user comprising:
a plurality of sensors;
a display arranged between at least two of the plurality of sensors;
processing circuitry in communication with a network, the processing circuitry configured to:
receive image data from the plurality of sensors;
receive a requested virtual camera position from the user;
establish a virtual camera location of a virtual camera different from positions of the plurality of sensors based on the requested virtual camera position;
set a first virtual camera angle and a second virtual camera angle of the virtual camera based on the requested virtual camera position;
render an image based on the image data and a position of the virtual camera; and
communications circuitry configured to transmit the image to a receiving user device via the network.

* * * * *